(12) United States Patent
Rio et al.

(10) Patent No.: US 11,891,881 B2
(45) Date of Patent: *Feb. 6, 2024

(54) CARBON SEQUESTRATION SYSTEM AND METHOD

(71) Applicant: Milestone Environmental Services, LLC., Houston, TX (US)

(72) Inventors: Gabriel Rio, Houston, TX (US); Jason Larchar, Spring, TX (US); Steve Bills, Houston, TX (US)

(73) Assignee: MILESTONE ENVIRONMENTAL SERVICES, LLC., Houston, TX (US)

( * ) Notice: Subject to any disclaimer, the term of this patent is extended or adjusted under 35 U.S.C. 154(b) by 333 days.

This patent is subject to a terminal disclaimer.

(21) Appl. No.: 17/397,202

(22) Filed: Aug. 9, 2021

(65) Prior Publication Data

US 2021/0363860 A1 Nov. 25, 2021

Related U.S. Application Data

(63) Continuation-in-part of application No. 17/205,665, filed on Mar. 18, 2021, now Pat. No. 11,105,186, which is a continuation-in-part of application No. 16/387,207, filed on Apr. 17, 2019, now Pat. No. 11,008,833.

(51) Int. Cl.
*E21B 41/00* (2006.01)

(52) U.S. Cl.
CPC ............... *E21B 41/0064* (2013.01)

(58) Field of Classification Search
CPC ...... E21B 21/066; E21B 21/065; E21B 43/40; E21B 43/34; E21B 43/35; E21B 41/0064; E21B 41/0057
See application file for complete search history.

(56) References Cited

U.S. PATENT DOCUMENTS

| | | |
|---|---|---|
| 2,365,858 A | 12/1944 | Binkley |
| 4,216,836 A | 8/1980 | Rayborn |
| 4,250,974 A | 2/1981 | Heilhecker |
| 5,310,285 A | 5/1994 | Northcott |
| 5,335,732 A | 8/1994 | McIntyre |
| 5,570,749 A | 11/1996 | Reed |
| 6,002,063 A | 12/1999 | Bilak |
| 9,518,435 B2 | 12/2016 | Fout |
| 10,909,547 B1 | 2/2021 | Guyer |
| 2006/0124524 A1 | 6/2006 | Duhe |
| 2008/0237141 A1 | 10/2008 | Kerfoot |

(Continued)

*Primary Examiner* — Kipp C Wallace
(74) *Attorney, Agent, or Firm* — MH2 TECHNOLOGY LAW GROUP, LLP

(57) ABSTRACT

A system for sequestering carbon in a well includes a fluid waste processor configured to receive the fluid waste, to receive water, to separate solids from the fluid waste such that a separated fluid waste is generated, and to introduce the separated fluid waste and the water into a disposal well, a first sensor positioned at a first location and configured to measure a flowrate of the separated fluid waste and the water. The system includes a data processor configured to determine an amount of carbon sequestered in the well based on the flowrate measured by the first sensor and a hydrocarbon content of the separated fluid waste and the water, and a second sensor positioned at a second location in the fluid waste processor, the second sensor configured to measure a flowrate of the separated fluid waste but not a flowrate of the water.

20 Claims, 3 Drawing Sheets

(56) References Cited

U.S. PATENT DOCUMENTS

| | | |
|---|---|---|
| 2010/0186767 A1 | 7/2010 | Martin |
| 2011/0303622 A1 | 12/2011 | Saik |
| 2012/0090325 A1 | 4/2012 | Lewis |
| 2014/0209312 A1 | 7/2014 | Munisteri |
| 2014/0371113 A1 | 12/2014 | Fout |
| 2016/0053594 A1 | 2/2016 | Nazarian |
| 2018/0016875 A1 | 1/2018 | Shokanov |

CARBON SEQUESTRATION SYSTEM AND METHOD

CROSS-REFERENCE TO RELATED APPLICATIONS

This application is a continuation-in-part of U.S. patent application Ser. No. 17/205,665, which was filed on Mar. 18, 2021 and which is a continuation-in part of U.S. patent application Ser. No. 16/387,207, which was filed on Apr. 17, 2019. Each of these priority documents is incorporated herein by reference in its entirety.

BACKGROUND

Various industrial and commercial processes generate waste that includes hydrocarbons, which can range from oil and natural gas to petrochemicals and the like. This waste may thus be referred to as "hydrocarbon-contaminated", as it includes hydrocarbons at a level that may be considered hazardous or otherwise inappropriate to dispose of in municipal landfills and the like. In some situations, these hydrocarbon-contaminated wastes (and other carbon-based products) may be sequestered in a subterranean formation, so as to prevent greenhouse gas emissions, contamination of groundwater sources, etc.

One source of such waste is drilling fluid. When drilling a wellbore in a subterranean formation, a fluid is pumped down into the wellbore to cool the drill bit and to circulate cuttings from the subterranean formation back to the surface. This fluid with cuttings is referred to as a drilling fluid waste. The drilling fluid waste may present environmental liabilities and may be expensive to dispose of at the surface. As a result, it may be desirable to dispose of the drilling fluid waste by disposing at least a portion of the drilling fluid waste in a subterranean formation, as noted above. However, particles in the drilling fluid waste may fall out of the drilling fluid waste if the density and/or viscosity of the drilling fluid waste is not within a certain range. This may limit the amount of drilling fluid waste that may be pumped back into the subterranean formation.

SUMMARY

Embodiments of the disclosure include a system for sequestering carbon in a well. The system includes a fluid waste processor configured to receive the fluid waste, to receive water, to separate solids from the fluid waste such that a separated fluid waste is generated, and to introduce the separated fluid waste and the water into a disposal well. The system also includes a first sensor positioned at a first location in the fluid waste processor, the first sensor being configured to measure a flowrate of the separated fluid waste and the water. A hydrocarbon content of the separated fluid waste and a hydrocarbon content of the water are determined at or proximal to the first location. The system further includes a data processor configured to determine an amount of carbon sequestered in the well based at least in part on a combination of the flowrate measured by the first sensor and the hydrocarbon content of the separated fluid waste and the water, and a second sensor positioned at a second location in the fluid waste processor, the second sensor configured to measure a flowrate of the separated fluid waste but not a flowrate of the water. A hydrocarbon content of the separated fluid waste at or proximal to the second location is determined.

Embodiments of the disclosure also include a method for sequestering carbon in a well, which includes processing a fluid waste using a fluid waste processor, wherein processing the fluid waste comprises mixing the fluid waste with a water, introducing at least a portion of the fluid waste into the well using the fluid waste processor, determining a flow rate and a hydrocarbon content of the fluid waste introduced into the well, determining a flow rate and a hydrocarbon content of the water, and determining an amount of carbon sequestration in the well based at least in part on the flow rate of the fluid waste and the water, and the hydrocarbon content of the fluid waste and the water.

Embodiments of the disclosure further provide a system for sequestering carbon in a well, which includes a receiving pit configured to receive a fluid waste, a shaker configured to receive the fluid waste from the receiving pit and to separate solids from the fluid waste so as to produce a separated fluid waste, a mixing tank configured to receive the separated fluid waste from the shaker and to mix the separated fluid waste, a pump configured to cause the separated fluid waste to flow into the well, a first sensor at a first location in the system, the first sensor being configured to measure a fluid flow rate of the separated fluid waste. A hydrocarbon content of the separated fluid waste is determined at or proximal to the first location. The system also includes a data processor configured to determine an amount of carbon sequestered in the well based at least in part on a combination of the fluid flow rate and the hydrocarbon content. At least a portion of the separated fluid waste is transferred from the mixing tank back into the receiving pit.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

Figure 1:
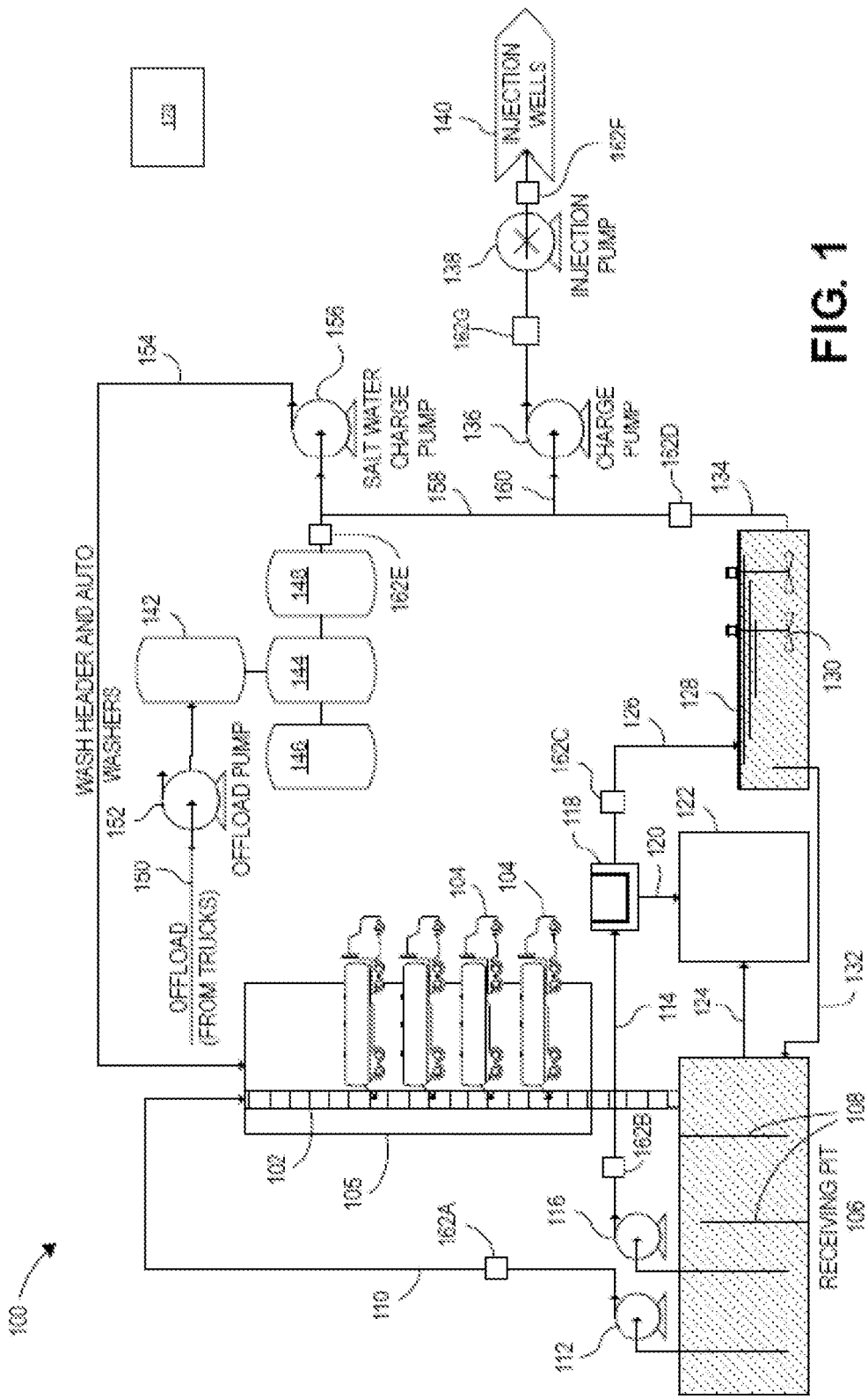
FIG. 1 illustrates a schematic view of a fluid disposal injection system, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Finally, unless otherwise provided herein, "or" statements are intended to be non-exclusive; for example, the statement "A or B" should be considered to mean "A, B, or both A and B."

FIG. 1 illustrates a schematic view of a fluid disposal injection system 100, according to an embodiment. The system 100 may be used to treat and subsequently inject a fluid waste, such as a hydrocarbon-contaminated waste fluid, into a disposal well in a subterranean formation, thereby sequestering the carbon content of the fluid waste in the well. Accordingly, the system 100 may include a fluid processing system (or "fluid waste processor" or "fluid processor") configured to receive the waste, process (e.g., separate, dilute, mix, etc.) the waste, and inject (e.g., pump) the waste into the well. One type of hydrocarbon-contaminated fluid waste that may be injected into the disposal well includes drilling fluid, e.g., used in drilling operations in the oilfield. Other types of hydrocarbon-contaminated fluid waste include, for example, waste from a power generation facility ("energy" waste), waste from an industrial facility ("industrial" waste), waste from a utilities facility ("utility" waste), waste from a manufacturing facility ("manufacturing" waste), and waste from a construction site ("construction" waste).

In some embodiments, the system 100 may include a preprocessor (not shown), which may treat the waste in advance of the waste reaching the fluid processor. For example, the preprocessor may provide chemical additives to the fluid waste, may grind, mill, or otherwise reduce the size of the solids suspended in the fluid waste, extract certain elements from the fluid waste (e.g., certain metals, plastics, etc.), and/or the like.

In a specific embodiment, the system 100 (e.g., the fluid processor thereof) may include a trench 102 configured to receive a fluid waste from a wellbore. The fluid waste may include cuttings (e.g., clay), water, hydrocarbons, chemicals introduced into the wellbore, or a combination thereof. The trench 102 may include a grate or other screening device that may be configured to allow one or more vehicles (e.g., trucks) 104 to drive over the trench 102, enabling a pull-through arrangement in the receiving area 105, rather than a back-in arrangement. Thus, as shown, the fluid waste may be transported from the wellbore to the trench 102 via the one or more trucks 104. In another embodiment, the fluid waste may be transported from the wellbore to the trench 102 via a pipeline.

The system 100 (e.g., the fluid processor thereof) may also include a receiving pit 106 that may receive the fluid waste from the trench 102. The receiving pit 106 may include one or more weirs 108 that form a tortuous path through the receiving pit 106, which may serve to mix the fluid waste into a substantially homogeneous state. A portion of the fluid waste in the receiving pit 106 may be transferred (e.g., through line 110 via pump 112) back to the trench 102 where the fluid waste may be used to create a slurry in the trench 102 to help the solids flow into the receiving pit 106 rather than accumulate in the trench 102. Another portion of the fluid waste in the receiving pit 106 may be transferred (e.g., through line 114 via pump 116) to a shaker 118 of the fluid processor.

The shaker 118 may be or include a shale shaker, a centrifuge, a filter, a strainer basket, a sieve, or the like. The shaker 118 may filter/separate solids (e.g., particles) from the fluid waste, thereby producing a removed set of solids and a separated fluid waste. In some embodiments, the shaker 118 may be provided by or otherwise representative of several shakers 118 operating in parallel. The solids separated by the shaker 118 may have a maximum cross-sectional dimension that is greater than about 100 microns, greater than about 200 microns, greater than about 300 microns, greater than about 400 microns, greater than about 500 microns, or larger. The size of the solids to be removed may be determined by formation properties, anticipated pumping schedules, and/or injection modeling software. For example, formations of higher porosity (e.g., >20%) can tolerate solids particles upwards of 1,000 microns, while formations of lower porosity (e.g., <10%) can tolerate fine particles less than 100 microns. In one example, the size of the solids may be determined by analyzing the formation porosity from gamma-ray emitting tools from open-hole logs and coordinating the porosity of a disposal well with an appropriate classification size.

The removed solids output from the shaker 118 may be transferred (e.g., through line 120) to a drying slab 122 of the fluid processor. The solids may then be ground into smaller particles sizes and introduced into the receiving pit 106, the shaker 118, and/or a mixing tank 128 of the fluid processor. In another embodiment, the solids may be introduced into a centrifuge (e.g., the shaker 118) for dewatering. In yet another embodiment, the solids may be transported to a landfill.

In at least one embodiment, at least a portion of the solids in the fluid waste in the receiving pit 106 may bypass the shaker 118 and be transferred (e.g., through line 124) to the drying slab 122. More particularly, the solids that settle on the bottom of the receiving pit 106 may bypass the shaker 118 and be transferred to the drying slab 122.

The separated fluid waste from the shaker 118 may be transferred (e.g., through line 126) to the mixing tank 128. The mixing tank 128 may also be referred to as a shaker tank. The mixing tank 128 may include one or more mixers 130 that stir/mix the separated fluid waste from the shaker 118 into a substantially homogeneous state. In at least one embodiment, one or more chemical additives may be added to the separated fluid waste in the mixing tank 128. Although a single mixing tank 128 is shown, in other embodiments, a plurality of mixing tanks may be utilized. One or more of the additional mixing tanks may not have associated shakers (e.g., such as shaker 118).

In at least one embodiment, at least a portion of the separated fluid waste may be transferred (e.g., via line 132) back into the receiving pit 106 to provide overflow protection (e.g., to prevent the mixing tank 128 from overflowing)

and/or provide recirculation to clean the receiving pit 106. At least a portion of the separated fluid waste may be transferred (e.g., through line 134 via one or more pumps 136, 138 of the fluid processor) into a well 140. The pump 136 may be or include a charge pump, and the pump 138 may be or include an injection pump. The well 140 may be or include a disposal well (also referred to as an injection well).

The system 100 (e.g., the fluid processor thereof) may also include a plurality of tanks (four are shown: 142, 144, 146, 148). Water may be introduced into the first tank 142 (e.g., through line 150 via an offload pump 152). The water may be introduced from one or more of the trucks. The water may be fresh water, salt water, brackish water, brine, or the like. The first tank 142 may be or include a de-sanding or buffer tank that is configured to separate solids (e.g., particles) such as sand from the water to produce a first separated water. The first separated water may be transferred into the second tank 144.

The second tank 144 may be or include a skim tank (also referred to as a gun-barrel tank) that is configured to separate oil from the first separated water to produce a second separated water. The oil may be transferred from the second tank 144 to the third tank 146, and the second separated water may be transferred from the second tank 144 to the fourth tank 148.

At least a portion of the second separated water may be transferred (e.g., through line 154 via pump 156) back to the trench 102 and/or the trucks 104. For example, the second separated water may be sprayed onto the trench 102 and/or in the trucks 104 (e.g., by one or more sprinklers, automated tank cleaners, or hoses and valves) to clean or otherwise remove buildup of the fluid waste and solids. At least a portion of the second separated water may be transferred (e.g., through lines 158, 160 via pumps 136, 138) to the well 140.

The system 100 may also include one or more sensors (seven are shown: 162A-G). The sensor 162A may be configured to measure one or more properties of the fluid waste flowing from the receiving pit 106 to the trench 102 in line 110. The sensor 162B may be configured to measure one or more properties of the fluid waste flowing from the receiving pit 106 to the shaker 118 in line 114. The sensor 162C may be configured to measure one or more properties of the separated fluid waste flowing from the shaker 118 to the mixing tank 128 in line 126. The sensor 162D may be configured to measure one or more properties of the separated fluid waste flowing from the mixing tank 128 to the well 140 in line 134. The sensor 162E may be configured to measure one or more properties of the second separated water flowing from the fourth tank 148 to the well 140 in line 158. The sensor 162F and sensor 162G may be configured to measure one or more properties of the separated fluid waste, the second separated water, or a combination/mixture thereof flowing to the well 140 in line 160. The properties may be or include flowrate, viscosity, density, pH level, percentage of solids, size of solids, pressure, temperature, or a combination thereof. A flowrate of the separated fluid waste in line 134 and/or the second separated water in line 158 may be modified to obtain the desired ratio of the mixture for injection into the well 140. The ratio of the separated fluid waste to the second separated water may be from about 10:1 to about 5:1, about 5:1 to about 3:1, about 3:1 to about 1:1, about 1:1 to about 1:3, about 1:3 to about 1:5, or about 1:5 to about 1:10. In another embodiment, the separated fluid waste may be pumped into the well 140 before and/or after the second separated water, such that the separated fluid waste and the second separated water are not combined/mixed prior to being pumped in to the well 140.

In some embodiments, the sensors 162D, 162E, and 162G may directly measure a composition (e.g., hydrocarbon content) of the fluid flowing in the respective, illustrated positions. In other embodiments, the fluid flowing at the respective positions may be sampled for further analysis at a different part of the site, or taken to a separate location (e.g., a laboratory) for analysis. As such, any one or more of the sensors 162D, 162E, and 162G may be omitted, or may be included to determine certain aspects, such as flow rate, in addition to providing sample locations for determining other characteristics.

Thus, a flowrate and composition of fluid at the locations of the sensors 162D, 162E, 162G may be measured, for example, with the fluid flowrate being metered continuously and the composition being measured continuously and/or determined at intervals by taking a sample and analyzing the sample. Specifically, the separated fluid waste in line 134 may be measured at sensor 162D. The water may be measured at sensor 162E (e.g., after being processed in the tanks 142-148), and the combination of water and separated fluid waste may be measured at 162G. In some embodiments, the composition may only be established at the location of the sensor 162G, which may be considered a "first" or "primary" sampling location. The sensor 162G may also be referred to as a "first" or "primary" sensor, although this should not be considered as contemplating a relative importance of the sensors or precluding embodiments with other sensors, e.g., sensors 162D and 162E (which may be referred to as "second" and "third" sensors). In other embodiments, the composition may be measured at the sensor 162D and at the sensor 162E in order to establish a source of the components that make up the composition measured at the sensor 162G.

The fluid sampled in the respective lines may be analyzed for hydrocarbon content (and/or certain other carbon-based content) in particular. Measuring the hydrocarbon content, in combination with a measurement of the amount of fluid injected into the disposal wells 140, may provide data related to the amount of carbon that is sequestered in the disposal wells 140 by the system 100. For example, the system 100 may include a data processor 170, which may be any type of computing device, that receives the measurement data and determines the carbon sequestered in the well, e.g., during a given time (e.g., a day, an amount of time required to process a load from a truck 104, etc.).

The wells 140 may provide a convenient location for such carbon sequestration, as the wells 140 may extend below the water line, which may reduce the risk of hydrocarbons contaminating ground water. Further, once in the well 140, the hydrocarbons may not be exposed to the ambient, surface atmosphere, which may prevent greenhouse gases from being released into the environment.

Regulatory agencies may provide credits for carbon sequestration but may require records of the amount of carbon sequestered. Accordingly, measuring the hydrocarbon present, and the flowrate of the waste fluid at sensor 162G may provide measurements from which such carbon sequestration amounts can be calculated (e.g., by the data processor 170) in the well over a certain amount of time, thereby establishing basis for the carbon sequestration credits. Further, the amount of carbon being sequestered from the fluid waste (e.g., received from the trucks 104) may be determined, e.g., by the data processor 170, based on the composition measurement taken at the sensor 162D, and the amount of carbon being sequestered from the water may be determined by the data processor 170 based on the composition measurement taken at the sensor 162G. In some embodiments, this may permit transfer of hydrocarbon credits to a particular customer that is responsible for bringing the fluid waste to the system 100.

Figure 2:
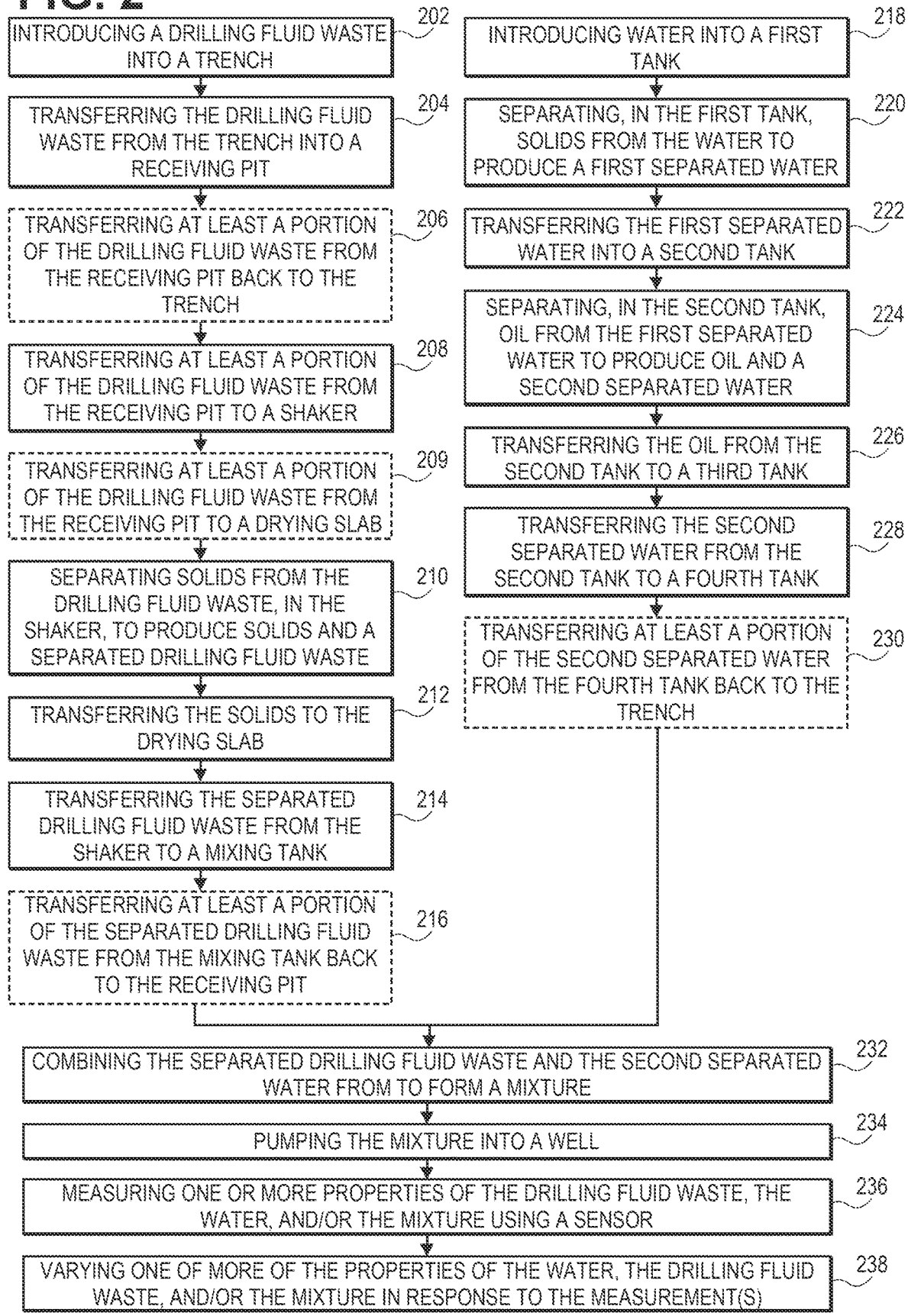
FIG. 2 illustrates a flowchart of a method for injecting a portion of a hydrocarbon-contaminated fluid waste into a well, according to an embodiment.

FIG. 2 illustrates a flowchart of a method 200 for carbon sequestration, e.g., by injecting a portion of a fluid waste into the well 140, according to an embodiment. As shown in the figure, the fluid waste may be a drilling fluid waste. In other embodiments, the fluid waste may be fluid waste, energy waste, industrial waste, manufacturing waste, construction waste, or any other type of hydrocarbon-contaminated waste. The method 200 may include introducing the fluid waste into the trench 102, as at 202. In some embodiments, before, during, or after proceeding through the trench 102, the fluid waste may proceed through a preprocessor, which may add chemicals, reduce solids dimensions, extract certain materials, etc.

The method 200 may also include transferring the fluid waste from the trench into the receiving pit 106, as at 204. The method 200 may also optionally include transferring at least a portion of the fluid waste from the receiving pit 106 back to the trench, as at 206. The method 200 may also or instead include transferring at least a portion of the fluid waste from the receiving pit 106 to the shaker 118, as at 208. The method 200 may also or instead optionally include transferring at least a portion of the solids in the fluid waste in the receiving pit 106 to the drying slab 122, as at 209.

The method 200 may also include separating solids from the fluid waste (e.g., using the shaker 118) to produce solids and a separated fluid waste, as at 210. The method 200 may also include transferring the solids to the drying slab 122, as at 212. The method 200 may also include transferring the separated fluid waste from the shaker 118 to the mixing tank 128, as at 214. The method 200 may also optionally include transferring at least a portion of the separated fluid waste from the mixing tank 128 back to the receiving pit 106, as at 216.

The method 200 may also include introducing water into the first tank 142, as at 218. The method 200 may also include separating, in the first tank 142, solids from the water to produce a first separated water, as at 220. The method 200 may also include transferring the first separated water into the second tank 144, as at 222. The method 200 may also include separating, in the second tank 144, oil from the first separated water to produce oil and a second separated water, as at 224. The method 200 may also include transferring the oil from the second tank 144 to the third tank 146, as at 226. The method 200 may also include transferring the second separated water from the second tank 144 to the fourth tank 148, as at 228.

The method 200 may also optionally include transferring at least a portion of the second separated water from the fourth tank 148 back to the trench 102 and/or the trucks 104, as at 230. As mentioned above, the second separated water may be used to clean/wash the trench 102 and/or the trucks 104. The method 200 may also include combining and/or mixing the separated fluid waste from the mixing tank 128 (in line 134) and the second separated water from the fourth tank 148 (in line 158) to form a mixture in line 160, as at 232. The method 200 may also include pumping the mixture in line 160 into the well 140 (e.g., using the pump(s) 136, 138), as at 234. One or more of the pumps 136, 138 may facilitate the mixing.

In another embodiment, the separated fluid waste and the second separated water may not be combined/mixed prior to being pumped in to the well 140. Rather, they may be pumped separately into the well 140. For example, the separated fluid waste may be pumped into the well 140 before the second separated water. In another example, the second separated water may be pumped into the well 140 before the separated fluid waste. In yet another example, the order in which the separated fluid waste and the second separated water are pumped into the well 140 may alternate (e.g., separated fluid waste, second separated water, separated fluid waste, second separated water, etc.).

The method 200 may also include measuring one or more properties of the fluid waste, the water, and/or the mixture using the sensors 162A-G, as at 236. The method 200 may also include varying one of more of the properties of the water, the fluid waste, and/or the mixture in response to the measurement(s), as at 238. In one example, the sensor 162D may measure a flow rate of the separated fluid waste, and the sensor 162E may measure a flow rate of the second separated water. In response to these measurements, one or both flow rates may be varied to cause a ratio of the mixture to be within a predetermined range. The predetermined range may depend at least partially upon the fluid waste received, the formation, and the conditions in and/or around the well 140. The flow rate(s) may be varied using one or more valves, pumps, or both.

In one example, the sensor 162D may obtain a measurement of the density and/or viscosity of the separated fluid waste. In another example, the sensor 162F may obtain a measurement of the density and/or viscosity of the separated fluid waste, the second separated water, or a combination/mixture thereof. In either of the foregoing examples, if the measurement is outside of a predetermined range, one or more additives may be added to change the measured property. The additives may be or include viscosifiers, barite, polymer, water, or a combination thereof. Alternatively, the amount/flow rate of the separated fluid waste and/or the second separated water may be varied to change the measured property. In another embodiment, no blending, additives, or modifications are made to the separated fluid waste.

The properties of the separated fluid waste, the second separated water, and/or the combination/mixture may depend at least partially on the subterranean formation surrounding the well 140. For example, to carry particles deep within the formation, the viscosity may be sufficient to prevent premature settling. In the system 100, the viscosity may be increased with barite or polymer additives using a series of viscometers and one or more polymer feed pumps with variable frequency drives.

To assist in achieving proper bottom-hole pressure (i.e., the primary force that induces flowrate through, and fracturing of, the subterranean formation), the density of the slurry may be maintained or modified to be sufficient to increase the hydrostatic pressure inside of the fluid column of the well 140. In the system 100, the density may be controlled by adding barite automatically with a barite feed auger in response to measurements from one or more of the sensors 162A-F (e.g., densitometers). In another embodiment, the separated fluid waste, the second separated water, and/or the combination/mixture thereof may be manually weighed, and sacks of barite may be introduced in response to the weight.

The injection rate of the separated fluid waste, the second separated water, and/or the combination/mixture into the well 140 may be set so as to provide a predetermined surface pressure and may, in some implementations, propagate fracture growth in the subterranean formation of the well 140. The injection rate may be controlled with the injection pump 138 automatically through the sensor 162F, which may include a pressure sensor, a flow meter, a densitometer, or a combination thereof. In another embodiment, the injection rate may be controlled manually by adjusting a variable frequency drive of the injection pump 138.

In another embodiment, the pump rate and/or the properties of the separated fluid waste, the second separated water, and/or the combination/mixture may be adjusted based at least partially upon the response of the subterranean formation, the pressure in the well 140, or both. When the injection process is nearing completion, the well 140 may be flushed with water to clean the well 140 and push the particles into the formation. For example, when the injection of the separated fluid waste is nearing completion, the second separated water may then be pumped into the well 140 to clean the well 140 and push the particles from the separated fluid waste into the formation.

Figure 3:
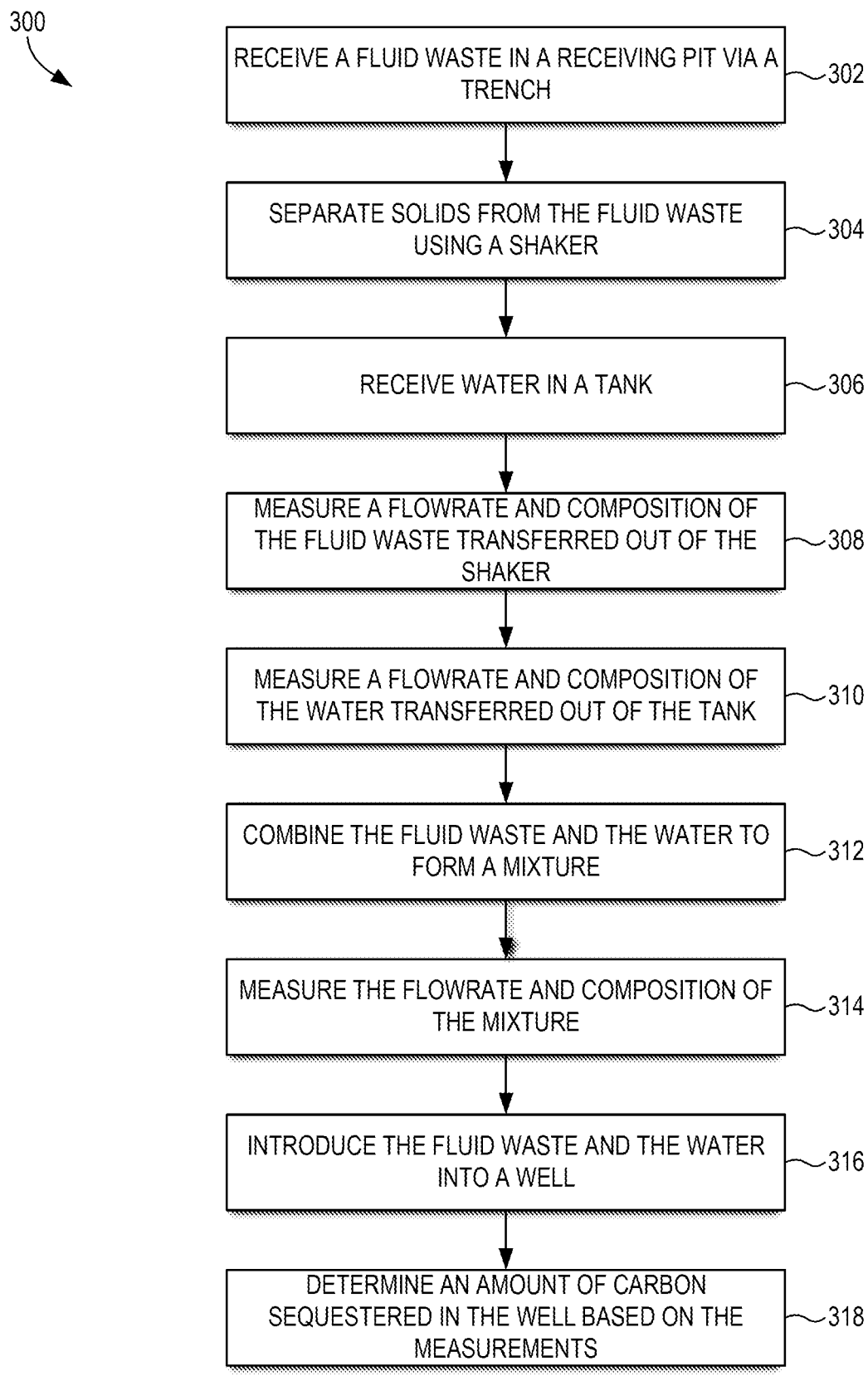
FIG. 3 illustrates a flowchart of a method for carbon sequestration, according to an embodiment.

FIG. 3 illustrates a flowchart of a method 300 for sequestering carbon in a well, according to an embodiment. In some embodiments, the method 300 may incorporate aspects of the method 200 and may employ the system 100. The method 300 may include receiving (e.g., drilling or any other hydrocarbon-contaminated) fluid waste in a receiving pit via a trench, as at 302, e.g., using the trench system discussed above. Solids may be separated from the fluid waste, as at 304, e.g., as discussed above with reference to blocks 204-216 in FIG. 2. The method 300 may also include receiving a water (e.g., salt water) in a tank or another water source, as at 306. The water may go through one or more processing/separation stages before reaching and/or after leaving the tank, as discussed above with reference to blocks 218-230.

The method 300 may then include measuring or otherwise determining a flowrate and composition (e.g., hydrocarbon content) of the fluid waste, as at 308. In some embodiments, the flowrate may be measured using a flowmeter or another sensor and may be employed to determine a flow rate (e.g., mass or volumetric) over a certain amount of time. The composition of the fluid waste may be determined from an analysis of a sample of the fluid waste taken downstream from where the solids are separated therefrom, as discussed above. In particular, the composition may indicate the hydrocarbon and/or other carbon content of the fluid waste in the sample.

The method 300 may also include measuring a flowrate and composition of the water, as at 310. The flowrate of the water may be measured using a flowmeter or another sensor and may be employed to determine a mass flow over a certain amount of time. Further, the composition may be determined from a sample of the water taken downstream from where the water treatment stages of the system 100 are located, and upstream of where the water is combined with the separated fluid waste. In particular, a hydrocarbon and/or other carbon content of the water may be determined from the sample.

In some embodiments, the water and the fluid waste may be combined to form a mixture, as at 312 (also discussed above with reference to block 232). The flowrate and composition of the mixture may be measured (e.g., downstream from their mixing), as at 314, similar to the measuring of the individual separated fluid waste and the water, upstream of their mixing. In particular, the flowrate may be determined using a flowmeter and employed to determine a mass or volumetric flow over a certain period of time. The composition, specifically the hydrocarbon content, may be determined in a laboratory from a sample of the mixture, or using a sensor in the system 100.

In some embodiments the water and fluid waste may be introduced into the well, as at 316, e.g., to sequester the carbon contained therein permanently. This may proceed by pumping the mixture of water and fluid waste into the well 140, or by pumping the fluid waste and the water separately.

Before, during, or after the actual introduction of the water and fluid waste in the well at 316, the method 300 may include determining an amount of carbon that is/was injected and thus sequestered in the well(s) 140 based on the measurements taken and/or determinations made, as at 318. For example, the flowrate and the hydrocarbon content of the mixture of the fluid waste and the water may be employed to determine an amount of hydrocarbon that was injected into the wells 140 during a certain time period (e.g., during a day). In other embodiments, the combination of the flowrate and hydrocarbon content of the individual water and separated fluid waste components of the mixture may be employed to determine the total hydrocarbon/other carbon content that was injected. In some embodiments, the hydrocarbon/other carbon content that was injected may be determined at specific intervals, and the composition may be assumed to be generally constant between the measurements.

The flowrate measurements discussed above may, in some cases, be acquired in real-time during the injection process; however, in at least some embodiments, the composition may be determined later, e.g., after transporting the sample to a laboratory or another location with suitable equipment. Thus, the flow rate may be recorded over a period of time and associated with the sample taken during that period of time, with it being assumed that the composition remained generally constant during the duration. Thus, the hydrocarbon/other carbon content may be calculated for the duration, but this calculation may take place after the measured water and waste have already been injected. In other embodiments, the hydrocarbon content may be established when a new truck 104 arrives, or in response to any other suitable factor. In still other embodiments, the composition of one of the fluids discussed above may be measured continuously (e.g., using sensors, rather than sampling), such that assumptions related to composition may be avoided.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for sequestering carbon in a well, comprising:
   a fluid waste processor configured to receive the fluid waste, to receive water, to separate solids from the fluid waste such that a separated fluid waste is generated, and to introduce the separated fluid waste and the water into a disposal well;
   a first sensor positioned at a first location in the fluid waste processor, the first sensor being configured to measure a flowrate of the separated fluid waste and the water, wherein a hydrocarbon content of the separated fluid waste and a hydrocarbon content of the water are determined at or proximal to the first location;
   a data processor configured to determine an amount of carbon sequestered in the well based at least in part on a combination of the flowrate measured by the first sensor and the hydrocarbon content of the separated fluid waste and the water; and
   a second sensor positioned at a second location in the fluid waste processor, the second sensor configured to measure a flowrate of the separated fluid waste but not a flowrate of the water, wherein a hydrocarbon content of the separated fluid waste at or proximal to the second location is determined.

2. The system of claim 1, wherein the fluid waste is a hydrocarbon-contaminated waste.

3. The system of claim 1, wherein the fluid waste comprises one or more fluid wastes selected from the group consisting of: drilling fluid, energy waste, industrial waste, utility waste, manufacturing waste, and construction waste.

4. The system of claim 1, wherein the fluid waste processor comprises:
   a receiving pit configured to receive the fluid waste;
   a shaker configured to receive the fluid waste from the receiving pit and to separate solids from the fluid waste so as to produce a separated fluid waste;
   a mixing tank configured to receive the separated fluid waste from the shaker and to mix the separated fluid waste; and
   a pump configured to cause at least the separated fluid waste to flow into the well.

5. The system of claim 4, further comprising a trench configured to receive the fluid waste from a pipeline or a truck, wherein the receiving pit is configured to receive the fluid waste from the trench.

6. The system of claim 4, wherein at least a portion of the separated fluid waste is transferred from the mixing tank back into the receiving pit.

7. The system of claim 4, further comprising a water source configured to provide water for injection into the well, wherein the water from the water source contains hydrocarbons.

8. The system of claim 1, further comprising a third sensor positioned at a third location in the fluid waste processor and configured to measure a fluid flow rate of the water but not the fluid flow rate of the separated fluid waste, wherein the hydrocarbon content of the water is determined at the third location.

9. The system of claim 1, wherein the fluid waste processor further includes:
   a first tank configured to receive water and to separate solids from the water to produce a first separated water;
   a second tank configured to receive the first separated water and to separate oil from the first separated water to produce a second separated water;
   a third tank configured to receive the oil from the second tank; and
   a fourth tank configured to receive the second separated water from the second tank, wherein the fluid waste processor is configured to cause the second separated water to flow into the well.

10. The system of claim 1, wherein the first sensor is not configured to measure the hydrocarbon content, and wherein the data processor is configured to determine the amount of carbon sequestered based at least in part on a fluid sample taken during a time interval during which the hydrocarbon content is assumed to be generally constant.

11. A method for sequestering carbon in a well, comprising:
   processing a fluid waste using a fluid waste processor, wherein processing the fluid waste comprises mixing the fluid waste with a water;
   introducing at least a portion of the fluid waste into the well using the fluid waste processor;
   determining a flow rate and a hydrocarbon content of the fluid waste introduced into the well;
   determining a flow rate and a hydrocarbon content of the water; and
   determining an amount of carbon sequestration in the well based at least in part on the flow rate of the fluid waste and the water, and the hydrocarbon content of the fluid waste and the water.

12. The method of claim 11, wherein the fluid waste comprises a hydrocarbon-contaminated fluid waste.

13. The method of claim 11, wherein the fluid waste comprises one or more fluid wastes selected from the group consisting of: drilling fluid, energy waste, industrial waste, utility waste, manufacturing waste, and construction waste.

14. The method of claim 12, wherein processing the fluid waste comprises:
   transferring the fluid waste from a trench into a receiving pit and then into a shaker;
   separating solids from the fluid waste, using the shaker, to produce a separated fluid waste; and
   transferring the separated fluid waste from the shaker into a mixing tank, wherein the separated fluid waste is the at least a portion of the fluid waste that is introduced into the well.

15. The method of claim 14, further comprising:
   transferring a portion of the fluid waste from the receiving pit back to the trench; and
   transferring a portion of the fluid waste from the mixing tank to the receiving pit.

16. The method of claim 14, wherein determining the hydrocarbon content of the fluid waste comprises:
   taking a sample of the separated fluid waste; and
   analyzing the sample during or after introducing the separated fluid waste into the well.

17. The method of claim 14, wherein the flow rate and the hydrocarbon content of the separated fluid waste is determined at a position that is upstream of the separated fluid waste mixing with the water.

18. The method of claim 17, wherein the flow rate and the hydrocarbon content of the water is determined at a position that is upstream of the separated fluid waste mixing with the water.

19. A system for sequestering carbon in a well, comprising:
   a receiving pit configured to receive a fluid waste;
   a shaker configured to receive the fluid waste from the receiving pit and to separate solids from the fluid waste so as to produce a separated fluid waste;

a mixing tank configured to receive the separated fluid waste from the shaker and to mix the separated fluid waste;

a pump configured to cause the separated fluid waste to flow into the well;

a first sensor at a first location in the system, the first sensor being configured to measure a fluid flow rate of the separated fluid waste, wherein a hydrocarbon content of the separated fluid waste is determined at or proximal to the first location; and a data processor configured to determine an amount of carbon sequestered in the well based at least in part on a combination of the fluid flow rate and the hydrocarbon content, wherein at least a portion of the separated fluid waste is transferred from the mixing tank back into the receiving pit.

20. The system of claim 19, further comprising a water source configured to supply water for mixing with the separated fluid waste, and a second sensor positioned at a second location in the system, the second sensor configured to measure a flowrate of the separated fluid waste but not a flowrate of the water, wherein a hydrocarbon content of the separated fluid waste at or proximal to the second location is determined.

* * * * *